(12) United States Patent
Eick et al.

(10) Patent No.: US 10,670,759 B2
(45) Date of Patent: Jun. 2, 2020

(54) NODAL HYBRID GATHER

(71) Applicant: CONOCOPHILLIPS COMPANY, Houston, TX (US)

(72) Inventors: Peter M. Eick, Houston, TX (US); Joel D. Brewer, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 105 days.

(21) Appl. No.: 15/248,700

(22) Filed: Aug. 26, 2016

(65) Prior Publication Data

US 2017/0059729 A1    Mar. 2, 2017

Related U.S. Application Data (60) Provisional application No. 62/210,130, filed on Aug. 26, 2015.

(51) Int. Cl.
| | |
|---|---|
| *G01V 1/38* | (2006.01) |
| *G01V 1/00* | (2006.01) |
| *G01V 1/16* | (2006.01) |

(52) U.S. Cl.
CPC ............ *G01V 1/3808* (2013.01); *G01V 1/003* (2013.01); *G01V 1/168* (2013.01); *G01V 1/3843* (2013.01); *G01V 1/3852* (2013.01)

(58) Field of Classification Search
CPC . G01V 1/16; G01V 1/168; G01V 1/20; G01V 1/3843; G01V 1/3852
USPC .......................................................... 367/15
See application file for complete search history.

(56) References Cited

U.S. PATENT DOCUMENTS

| | | | |
|---|---|---|---|
| 5,598,378 A * | 1/1997 | Flentge | G01V 1/20 367/56 |
| 6,026,058 A | 2/2000 | Thomas | |
| 6,330,512 B1 | 12/2001 | Thomas et al. | |
| 6,430,510 B1 | 8/2002 | Thomas et al. | |
| 2005/0047275 A1 | 3/2005 | Chamberlain | |
| 2011/0228635 A1* | 9/2011 | Tenghamn | G01V 1/3852 367/16 |
| 2012/0316785 A1 | 12/2012 | Liu | |
| 2014/0211589 A1 | 7/2014 | Maxwell | |
| 2016/0109595 A1* | 4/2016 | Stork | G01V 1/36 367/46 |

OTHER PUBLICATIONS

Vermeer, G.J.O., and Grimbergen, J.L.T., 1998, 3D prestack migration with cross-spreads: EAGE Conference, Extended Abstracts, paper 1-51. Application of prestack migration to basic subsets. (Year: 1998).*
International Search Report for related case, App. No. PCT/US2016/049006, dated Jul. 11, 2016.
Morton A. et al., Evaluation and impact of sparse-grid, wide-azimuth 4C-3D node data from the North Sea, 73rd SEG International Exposition & Annual Meeting—Dallas, Texas—Oct. 26-31, 2003.

(Continued)

*Primary Examiner* — Ian J Lobo
(74) *Attorney, Agent, or Firm* — Polsinelli PC (57) ABSTRACT

The present disclosure provides methods of data acquisition and processing of seismic data that combines nodal survey design, especially sparse nodal surveys, with the hybrid gather processing methodologies.

20 Claims, 10 Drawing Sheets

(56) References Cited

OTHER PUBLICATIONS

Wei, L., et al., Imaging Quality with Sparse Acquisition Parameters in Ocean Bottom Node Survey, 75th EAGE Conference & Exhibition incorporating SPE EUROPEC 2013.
Olofsson B. et al., Decimation test on an ocean-bottom node survey: Feasibility to acquire sparse but full-azimuth data, Geoscience World 31(4): 457-464 (2012).
Vermeer, G.J.O, Processing orthogonal geometry—what is missing?, SEG-2005-2201.

* cited by examiner

NODAL HYBRID GATHER

PRIOR RELATED APPLICATIONS

This application is a non-provisional application which claims benefit under 35 USC § 119(e) to U.S. Provisional Application Ser. No. 62/210,130 filed Aug. 26, 2015, entitled "NODAL HYBRID GATHER," which is incorporated herein in its entirety.

FIELD OF THE DISCLOSURE

The disclosure generally relates to seismic surveying and seismic data processing methods.

BACKGROUND OF THE DISCLOSURE

For many years seismic exploration for oil and gas has involved the use of a source of seismic energy and its reception by an array of seismic detectors, generally referred to as geophones on land, and hydrophones at sea. In land surveys, the source of seismic energy can be a high explosive charge electrically detonated in a borehole located at a selected point on the terrain, or a vibrator truck that creates a series of vibrations or impacts of a baseplate to the earth's surface. At sea, the most common source is an air gun.

The acoustic waves generated in the earth by these various seismic sources are partially reflected from various earth layers and transmitted back from layer boundaries and reach the surface of the earth at varying intervals of time, depending on the distance and characteristics of the subsurface traversed. These returning waves are detected by the receivers, which function to transduce such acoustic waves into representative electrical signals.

Conventionally, an arrangement of receivers is generally laid out along a line to form a series of observation stations within a desired locality. The seismic source applies an acoustic signal to the earth, and the detected signals, which are reflected from points midway between the source and receiver, are recorded for later processing.

These recorded signals or "traces" are continuous electrical analog signals depicting amplitude versus time, and are generally quantized using digital computers so that each data sample point may be operated on individually.

The receiver arrangement is then moved along the line to a new position where some of the shot or receiver points may overlap, and the process repeated. With enough repeats, a seismic survey is obtained. If the ground and subsurface reflecting layer are flat, as previously mentioned a seismic shot yields data from midway between the source and receiver.

One of the techniques utilized in processing seismic data is to combine traces produced from two or more shots wherein the midpoint between the source and the receiver in each case is the same, although the offset, i.e., sources to receiver distance, may be different. When two or more traces belonging to a common midpoint (CMP) are summed, the technique is called common-midpoint stacking.

A single wave-producing activation of a source (regardless of the source type), called a "shot," results in generating a number of traces equal to the number of receivers. Aligning all of the recorded traces from a single shot in a side by side display i.e. a "shot gather" can produce a rudimentary two dimensional seismic section. The section can be improved, however, by the CMP stacking. Since sound traveling two different paths gives information from approximately the same subsurface point, two such traces reflected from a common point can be combined, i.e., summed, such that reflection amplitudes are added but the noise, which occurs at different times on the two traces, is not added thus improving the signal-to-noise ratio. The number of traces summed in an individual stack is called the multifold or simply the "fold."

More recently, seismic surveys involve receivers and sources laid out in more complex geometries, generally involving rectangular or non-orthogonal grids covering an area of interest so as to expand areal coverage and enable construction of three-dimensional (3D) views of reflector positions over wide areas.

Figure 1:
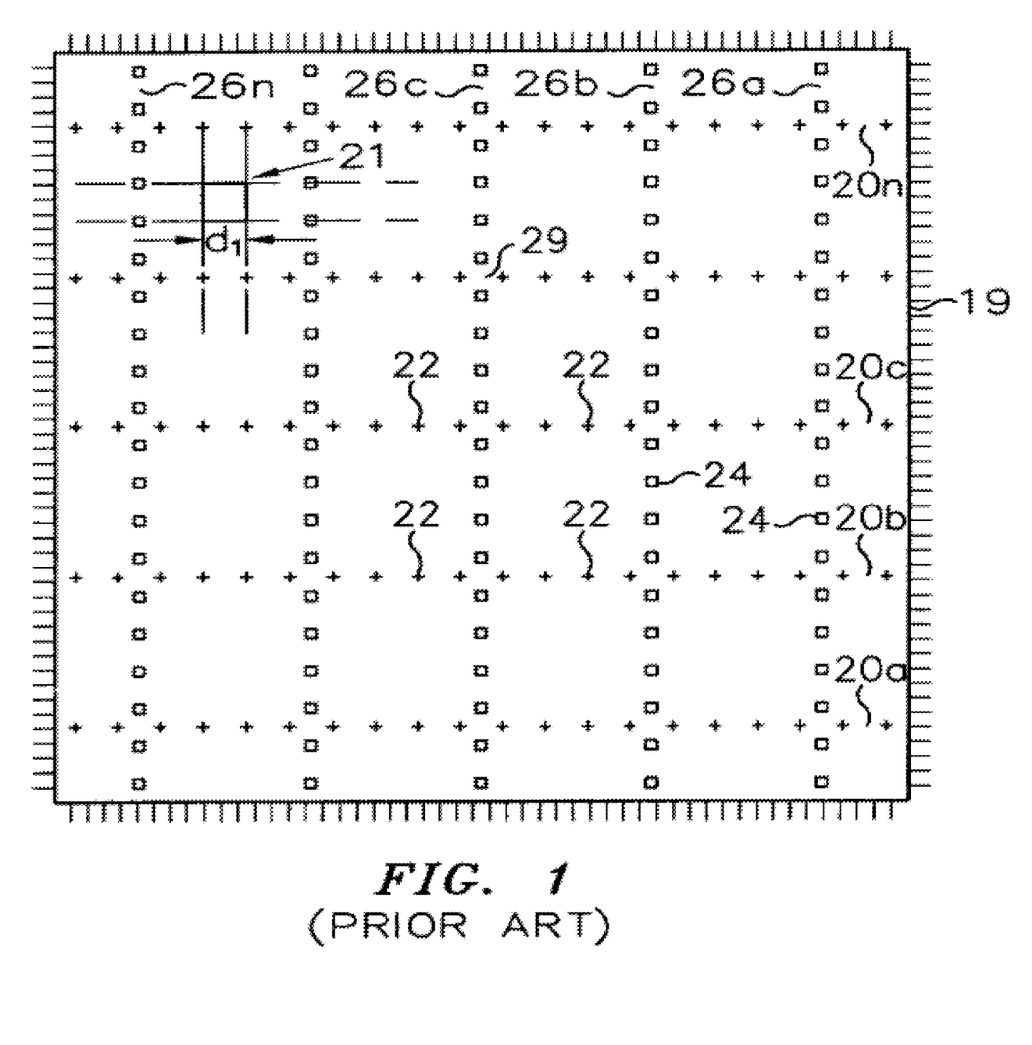
FIG. 1. A typical prior art seismic source/receiver layout geometry.

A normal prior art three-dimensional survey geometry is shown in FIG. 1, in which a basic grid, indicated generally at 21, is defined for effective placement of shotpoints that are designated as squares 24, and geophone receivers that are designated as crosses 22. As illustrated, the basic grid 21 is a square having a dimension d1 that is equal to twice the desired reflection midpoint spacing, and that will provide an image having a desired resolution of subsurface features.

A plurality of geophone receiver lines 20a-20n each containing a plurality of equally spaced apart geophone receivers 22 is place in parallel on the earth's surface. A plurality of shotpoints 24 is placed along source or shot lines 26a-26n which run orthogonally to the receiver lines 20a-20n, thus providing a symmetrical crossed array geometry with geophone receivers 22 in lines 20a-20n and source stations 24 in lines 26a-26n spaced apart a distance equal to d1, and the lines 26a-26n spaced apart a distance of four times d1 (4d1). This crossed-arrayed geometry produces subsurface spatial resolution in which midpoints are spaced apart by one-half of the distance d1 in the receiver line, and one-half of the distance d1 in the source line. For example, if receivers and sources, as shown in FIG. 1, are each spaced 165 ft. apart, reflection midpoints will be spaced apart by 82.5 ft. and four adjacent midpoints will form a square.

It is well known, however, to those skilled in the art that improved surface sampling resolution in a survey can be obtained with a source/receiver geometry that is referred to herein as "true 3D coverage." This geometry also uses CMP stacking in which the shotpoints and receivers are laid out in the generally rectangular areas similar to the arrangement shown in FIG. 1, but with closer spacing of the receiver lines 20 in the shotpoint line direction. As used herein, a true 3D seismic source/receiver geometry locates a geophone receiver and/or a shotpoint at each intersection of the basic grid 21.

Figure 2A:
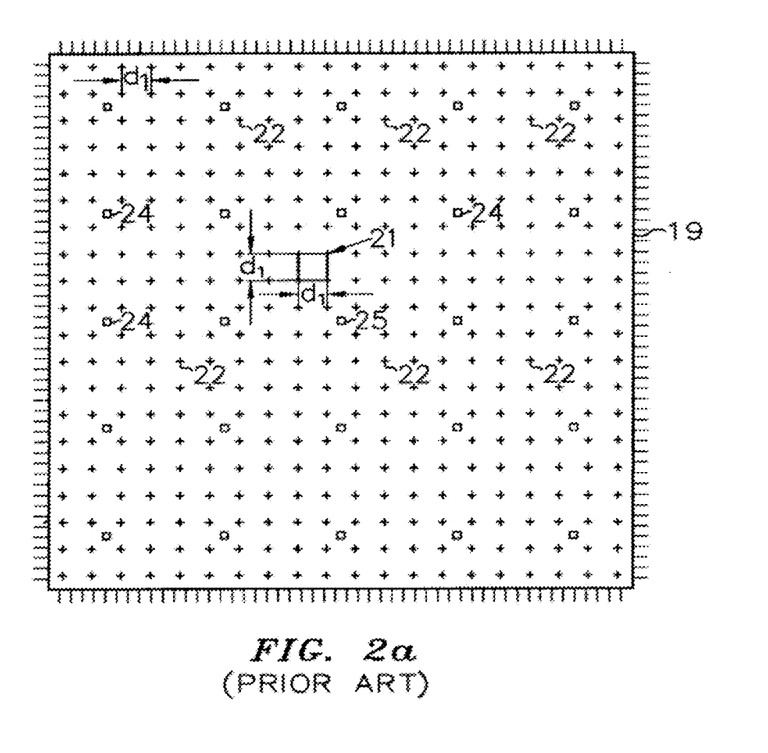
FIG. 2A. A prior art true 3D source/receiver layout geometry.
Figure 2B:
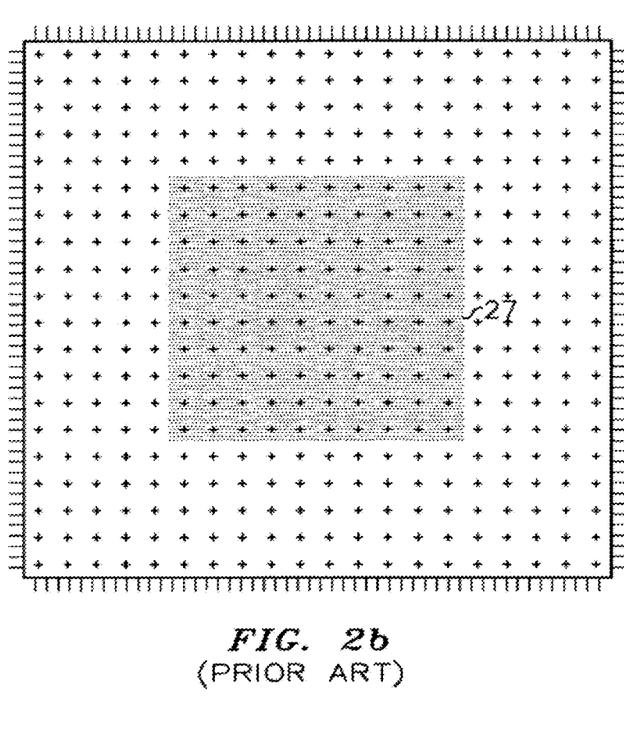
FIG. 2B. Single-fold midpoint coverage from activation of a single source of FIG. 2A.

An example of true 3D seismic source/receiver geometry having a geophone receiver at each intersection of the basic grid 21, and having shotpoints spaced apart at a distance four times d1 is illustrated in FIGS. 2A and 2B. Using the same size basic grid 21 as shown in FIG. 1, such a true 3D layout would include 400 geophone receivers and 25 shotpoints covering a surface area 19 in FIG. 2A that is equal to the surface area 19 shown in FIG. 1. Once all of the receivers and shotpoints are in place, the shots are sequentially activated and a number of traces that is equal to the number of shots times the number of receivers are recorded to provide a single data set from which a display of a seismic 2D section, or a 3D volume could be produced. In this true 3D technique the recorded traces having common midpoints, which are sorted out later from the recorded traces, are gathered in a display, which yield greatly increased surface resolution compared to the surface resolution shown in FIG. 1.

In seismic acquisition and processing operations, it is well known to those skilled in the art that a frequency ambiguity called aliasing is inherent in sampling systems, and that aliasing occurs in a sampling process when there are fewer than two samples per cycle. Aliasing applies to both the time and space domains. The aliasing that is done by the separated elements of geophone receivers and shotpoints is called spatial aliasing and depends on the surface spacing of the shotpoints and receiver. The aliasing that is done by sampling an input signal is called frequency aliasing and is dependent on the sampling interval used to digitize input signals.

To avoid aliasing, filtering is commonly required. For example, an alias filter applied before sampling a geophone signal at a ground location removes certain undesired frequencies, likewise a velocity filter of a seismic gather attenuates certain coherent arrivals of waves, which sweep over the geophone receivers having certain apparent receiver velocities. Accordingly, an advantage of true 3D seismic source/receiver layout geometry is avoiding spatial aliasing.

There is a disadvantage to this kind of true 3D shooting, however, in the excessive amount of equipment required to occupy every surface location with a receiver and/or a source on a grid interval equal to twice the desired subsurface resolution. Today, however, a normal 3D seismic survey based on a layout geometry similar to FIG. 1 is an accepted part of the early data-acquisition process because the high resolution display of 3D surveys leads to an optimized appraisal of sites, refined reserve estimates, and more efficient development plans. Accordingly, the benefits of a 3D survey using source receiver geometry similar to that shown in FIG. 1, although having certain known deficiencies, usually outweigh the additional cost compared to a 2D survey. Accordingly, if use of 3D seismic surveys is to continue to grow, a need exists for new and improved methods that simplify and/or provide economical alternatives that reduce the operational cost of obtaining a 3D seismic survey.

U.S. Pat. No. 6,026,058 by Phillips Petroleum attempted to solve some of these issues by applying what is called a "hybrid gather" method. In this method, full survey data from a crossed-array source/receiver layout geometry is assembled from a series of hybrid gathers that are centered at the intersections of the crossed-array source/receiver lines.

A hybrid gather, as described in U.S. Pat. No. 6,026,058, is a side-by-side grid display of seismic traces corresponding to a gather center located within in a larger 3D crossed-array seismic grid layout and includes traces selected from sectional parts of the larger layout. Accordingly the hybrid gather is a singlefold CMP gather center about a source/receiver line intersection, which has a desired spatial resolution in both shot line and receiver line directions.

Steps in obtaining the hybrid gather include laying out the larger than normal crossline spacing 3-D crossed array source/receiver survey area, with a selected dimension d applied to the spacing between both the source lines and receiver lines and a smaller dimension $d_1$ applied between sources and receivers in the respective source or receiver line. The dimensions d and $d_1$ thus define the number of sources in a selected source line, and the number of receivers in a selected receiver line to be included in the hybrid gather corresponding to each hybrid gather center.

Next, a normal recording is made where a seismic source is energized at each shotpoint in the 3-D survey to induce seismic pulses into the earth, and the reflected seismic pulses generated by each of the geophone receivers are recorded for later processing.

A series of hybrid gathers is then obtained by performing hybrid gathers at each intersection of the crossed array of source and receiver lines of the larger 3-D survey area, such that when the series of hybrid gathers is complete, traces from the entire survey area can be gathered by assembling the series of hybrid gathers. Thus the spatial resolution associated with the fully assembled gather is equal to the spatial resolution of a true source/receiver layout.

However, this method did not work well with a limited number of receivers. Conventional approaches as defined by U.S. Pat. No. 6,026,058 are fundamentally geared around land seismic data, where commonly there are more receivers than shots. Hybrid gathers are best when the station spacing between the shots and the receivers are the same while the line spacing is not critical as each hybrid gather is independent. On a conventional land survey the station spacings are commonly the same and normally relatively small distances. In the marine case though, placing marine receivers is quite expensive and each unit is also expensive so they are normally coarsely laid out. The shots on the other hand tend to be very cheap so they are quite densely laid out. These conditions result in poor hybrid gather formation by the conventional approach.

Thus, what is needed in the art are better methods of collecting and processing seismic datasets, so as to further reduce noise, improve efficiencies and reduce costs.

SUMMARY OF THE DISCLOSURE

The disclosure relates to methods of collecting seismic data and processing of that data to acquire accurate images of the subsurface.

In particular, the disclosure relates to the combining of hybrid gather processing methods that are used with nodal surveys, preferably sparse nodal surveys. The surveys are either land or marine surveys, but the methods have particular applicability in the offshore environments.

One advantage of the present invention is that it provides increased flexibility in use of given equipment for field operations that obtain 3D seismic survey data.

Another advantage is that we can gather partial data from a section of a survey area having source line and receiver line resolution that facilitates unaliased 3-D digital filtering.

Another advantage is that we can have an early look at subsurface features from partial prestacked reconnaissance data having characteristics similar to 3D processed data, so as to guide further planning of a seismic survey program, and/or processing of the seismic data.

A further advantage is the ability to filter and remove source generated noise efficiently in the hybrid gather domain with simply designed filters. This offers improved resolution, data quality and better interpretations of the subsurface geology.

In more detail, the invention includes any one or more of the following embodiments, in any combination(s) thereof:

A method of creating a hybrid gather for seismic data processing, said method comprising:

a) providing a first grid layout of seismic sources and second grid of cable-free node receivers over a subsurface reservoir;

b) actuating one or more seismic sources a plurality of times according to said first grid layout and collecting seismic data with said receivers;

c) determining an appropriate size of a hybrid gather from said collected seismic data;

d) collecting traces at each receiver for each shot that meets the hybrid gather size defined in step (c); and e) sorting the collected traces into a hybrid gather, wherein said hybrid gather is used for filtering, processing or analysis of the collected seismic data.

A method of seismic data processing to provide a 3D image of a reservoir, said method comprising:
a) providing a first grid layout of seismic sources and a second grid layout of cable-free node receivers over a subsurface reservoir;
b) actuating one or more seismic sources a plurality of times according to said first grid layout and collecting seismic data with said receivers;
c) determining an appropriate size of a hybrid gather from the collected seismic data;
d) collecting traces at each node receiver for each shot that meets the size requirement defined in step (c);
e) sorting the gathering traces into a hybrid gather, wherein said hybrid gather is used for filtering, processing or analysis of the collected seismic data; and
f) imaging a 3D seismic map of the subsurface reservoir.

A method of seismic data processing to provide a 3D image of a reservoir, said method comprising:
a) obtaining seismic data from a sparse nodal seismic survey of a subsurface reservoir;
b) determining an appropriate size of a hybrid gather from said seismic data;
c) collecting traces at each node receiver for each shot that meets the size requirement defined in step (b);
d) sorting the gathering traces into a hybrid gather, wherein said hybrid gather is used for filtering, processing or analysis of the collected seismic data; and
e) imaging a 3D seismic map of the subsurface reservoir.

A non-transitory machine-readable storage medium, which when executed by at least one processor of a computer, performs the steps of any method herein described.

Any method herein described, including the further step of imaging a 3D seismic map of the subsurface reservoir.

Any method herein described, wherein said receivers are sparsely positioned such that the spacing between adjacent receivers in a line is less than one half the spacing between adjacent receiver lines.

Any method herein described, wherein said receivers are ocean bottom node receivers, or land node receivers.

Any method herein described, wherein said sources or receivers or both are uniformly placed on a grid.

Any method herein described, wherein said sources or receivers or both are not uniformly placed on a grid.

Any method herein described, wherein the receivers are not uniformly placed on a grid, but said sources are uniformly placed on a grid.

Any method herein described, wherein the sources, receivers or both are not orthogonally laid out.

Any method herein described, wherein the sources, receivers or both are orthogonally laid out.

By "obtaining" seismic data and such herein we do not mean to imply the requirement of performing an actual seismic survey and collection of data, which is typically performed in advance of data processing and imaging, and usually by different parties. Merely obtaining a copy of the data will suffice.

By "gather" what is meant is a display of seismic traces that share an acquisition parameter, such as a common midpoint gather, which contains traces having a common midpoint. FIG. 2 shows some common gather patterns.

By "hybrid gather" what is meant is all recorded traces from a typically orthogonally intersecting pair of source and receiver line taking on the properties of a series of typically orthogonal common shot gathers and a series of common receiver gathers, defining a 3D volume centered at the intersection of the orthogonal source and receiver lines. While non-orthogonal hybrid gathers are possible, they are more cumbersome, as the source generated noise defines an ellipse instead of a circle in the hybrid space. Designing an elliptical filter for a non-orthogonal hybrid is much more difficult than a circular filter for an orthogonal hybrid.

A used herein a "hybrid gather survey" is a seismic survey consisting of parallel source lines intersecting a typically orthogonal set of parallel receiver lines in a grid-like manner in which a hybrid gather is formed with each intersection.

A 3D survey acquired with orthogonal source and receiver lines generates a hybrid gather at each intersection between a source line and a receiver line and thus may be considered a "hybrid gather survey." The hybrid gather survey consists of a much smaller number of receiver lines, more widely spaced, and widely spaced orthogonal source lines than a "true" 3D survey design.

By "supergather" what is meant is the merging of several adjacent CMP gathers.

As used herein a "hybrid supergather" consists of all the CMP gathers in an area between two adjacent source lines and the area between two adjacent receiver lines in a hybrid gather survey. Inlines between two receiver lines are combined, while crosslines between two source lines are combined. The CMPs in this entire area act as one supergather, with geometrical distribution of source-receiver offsets and azimuth the same as each hybrid gather. The subsurface CMP coverage, although not as small as a single CMP bin, is limited to the source line and receiver line spacing.

By "nodal survey" what is meant is a seismic survey that uses a cable-free receiver system, such as ZNodal®, Z700®, Z3000®, GSX® or similar seismic recording systems. Such surveys are commonly used in marine environments, but can also be used onshore in the form of the ZLand®, GSR®, Unite®, Iseis® or similar. In addition to the ocean bottom node (OBN), such a system also includes recovery hardware like ropes and transponders or baseline or ultra-short baselines for node location and recovery. On the source side we normally would deploy a source like airgun arrays on each source vessel for shot initiation.

By "sparse nodal survey" what is meant is that the receiver nodes are located such that the receiver station spacing is more than the half the line spacing between receiver lines. Thus, a station spacing of 50 m would become a sparse survey if the line spacing is less than 100 m. A 50 by 100 m spacing would be the turning point, not being considered sparse. A 100 by 100 m spacing would be sparse and be a square grid (if orthogonal). There are no examples where the receiver station spacing is greater than the line spacing because the identification of the lines and stations would flip once past the equal point.

Normally in a sparse nodal survey, the receiver station spacing is commonly 250 m to 400 m with current technologies for deployment of ROV placed nodes. However, this can vary with survey design, equipment and new processing methods.

A "bin" when used as a noun is a subdivision of a seismic survey. The area of a three-dimensional survey is divided into bins, which are commonly on the order of 25 m [82 ft] long and 25 m wide. Traces are assigned to specific bins according to the midpoint between the source and the receiver, reflection point or conversion point. Bins are commonly assigned according to common midpoint (CMP), but more sophisticated seismic processing allows for other types of binning. Traces within a bin are stacked to generate the output trace for that bin. Data quality depends in part on the number of traces per bin, or the "fold." A "natural bin" is defined as being one half the distance between the nominal source stations and receiver stations respectively.

While other binning patterns are possible, as in superbins (a summation of the natural bins described above), or even hexagonal or random binning, they are less commonly seen. For the purpose of explanation of the invention we will assume natural bins are used, but this is not essential.

When used as a verb, "binning" is the sorting of seismic data into small areas according to the midpoint between the source and the receiver, reflection point or conversion point prior to stacking. Equal offset binning, equal area binning, natural binning are all methods can be used herein.

By "stacking" herein, what is meant is the adding together or summing of traces from different seismic records to reduce noise and improve overall data quality because real signals are added and incoherent noise usually cancels out. The number of traces that have been added together during stacking is called the "fold." The "stack" is the added together traces in the seismic record.

A "trace" as used herein refers to the seismic data recorded for one channel or node. A trace is a recording of the Earth's response to seismic energy passing from the source, through subsurface layers, and back to the receiver.

A "seismic record" as used herein refers to all traces recorded from a single shotpoint. Numerous seismic records are displayed together in a single seismic section.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| CIG | Common-image gather |
| CMP | Common-mid point |
| CRG | Common-receiver gather |
| CSG | Common-shot gather |
| KPSDM | Kirchhoff Pre-Stack Depth Migration |
| KPSTM | Kirchhoff Pre-Stack Time Migration |
| NAZ | Narrow Azimuth |
| OBC | Ocean Bottom cable |
| OBN | Ocean-bottom node |
| OBS | Ocean-bottom seismometer |
| RTM | Reverse time migration |
| VSP | Vertical seismic profile |
| WAZ | Wide azimuth |

DETAILED DESCRIPTION

In the following description numerous details are set forth to provide an understanding of the present disclosure. However, it will be understood by those of ordinary skill in the art that the present disclosure may be practiced without these details and that numerous variations or modifications from the described embodiments may be possible.

Figure 3:
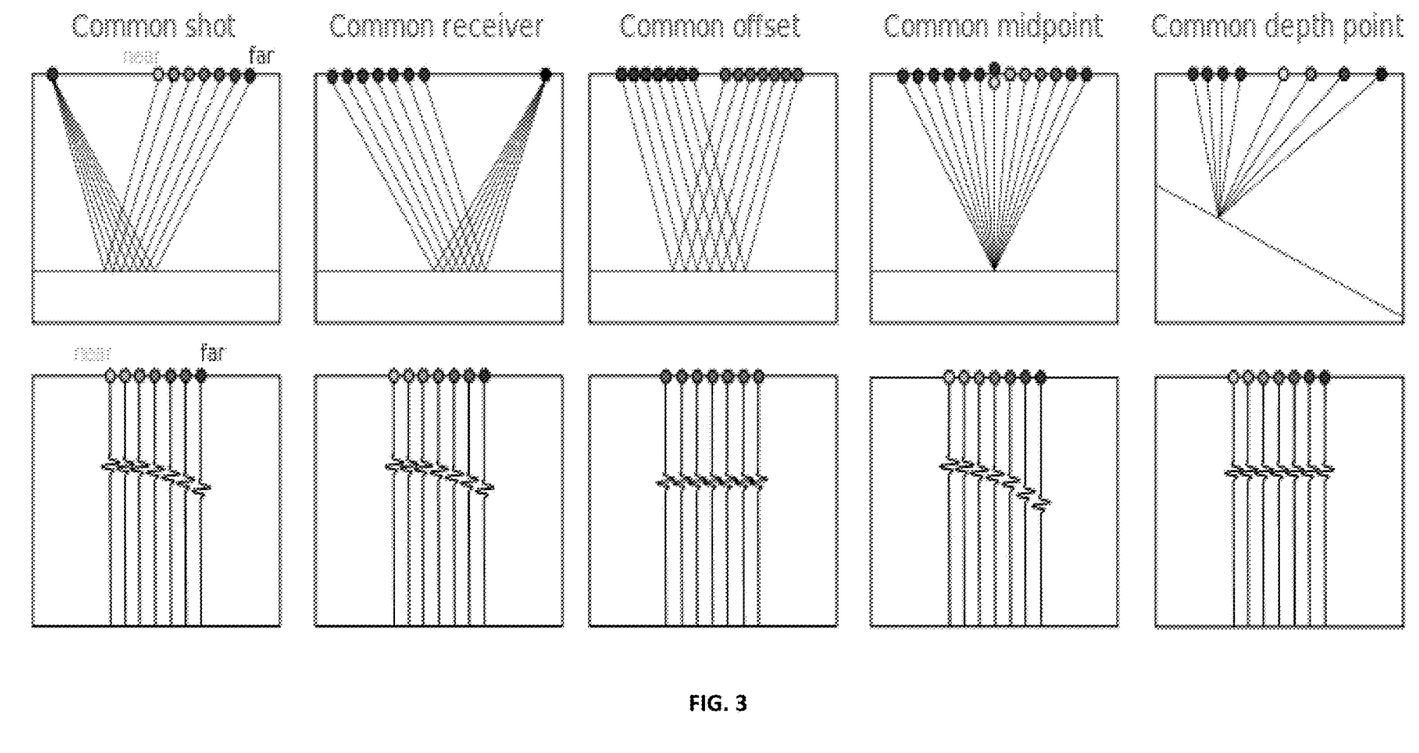
FIG. 3. Common gather types.

When geophysicists speak about pre-stack data, they are usually talking about a particular class of gather. A gather is a collection of seismic traces that share some common geometric attribute. The term gather usually refers to a common image point (CIP) or common mid-point (CMP) gather. Gathers are sorted from field records in order to examine the dependence of amplitude, signal to noise, move-out, frequency content, phase, and other seismic attributes, on offset, incidence angle, azimuth, and other geometric attributes that are important for data processing and imaging. See e.g., FIG. 3 for some common gather types.

Figure 4A:
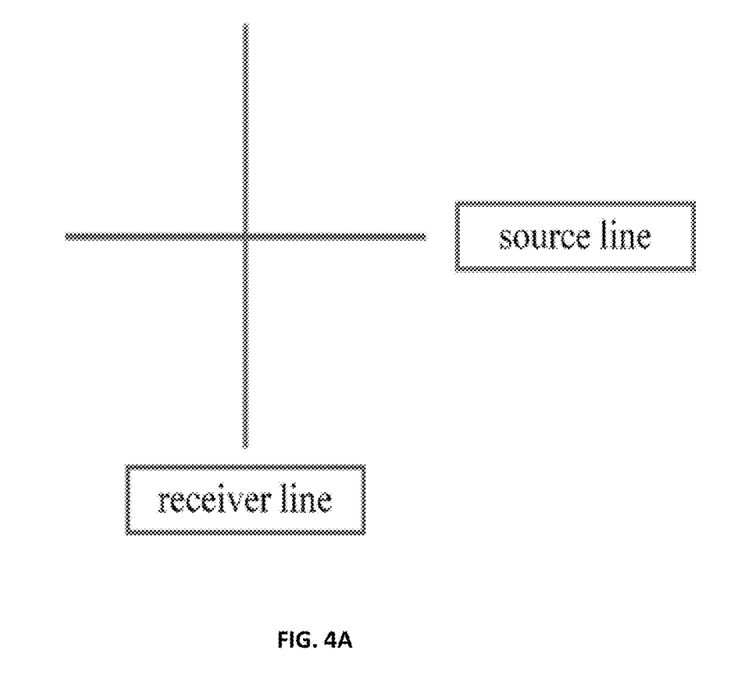
FIG. 4A. A cross-spread of intersecting source and receiver lines is shown. The CMPs of this spread lead to the areal hybrid gathers.
Figure 4B:
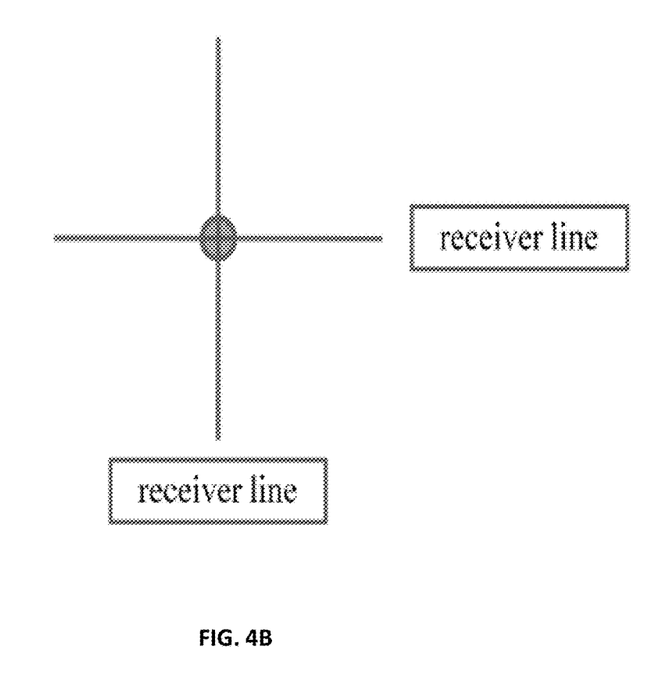
FIG. 4B. A cross-spread of two intersecting receiver lines with a source at their intersection (circle). This results in two 2D shot records.

A hybrid gather, by contrast, is a type of cross-spread gather. A cross-spread typically refers to orthogonally intersecting source and receiver lines (FIG. 4A) or orthogonally intersecting receiver lines, with a source at their intersection (FIG. 4B). Both of these seismic arrays form an X shape, hence the name "cross-spread." Focusing on the type of cross-spread with intersecting source and receiver lines, an areal cross-spread appears to be the same as a hybrid gather. They do, in fact, share the same geometry, but the hybrid gather is different because of the way in which gathers are acquired. The single shot into intersecting receiver lines yields two 2D profiles, and thus is not the same as the hybrid gather. The single shot into an areal receiver spread yields a "teepee," but the subsurface positions of the reflection points are distributed differently in the hybrid gather. Utilizing a cross-spread of source and receiver lines in a way which gathers the same information as a series of individual common shot lines, common receiver lines, and a 3D volume of the area can be called a hybrid gather. A 3D survey of orthogonal source and receiver lines yields a collection of overlapping hybrid gathers.

It should be noted that hybrid gathers can be collected on non-orthogonal surveys also. In this case the relationship between the source line and the receiver line would not be orthogonal but would be at some angle, for example 45 degrees to each other in the case of a 45 degree slash survey or the common zig-zag survey. There is no particular reason why the hybrid in this angled relationship would behave any differently than an orthogonal hybrid. The main difference is the ease of writing filters to take advantage of the hybrid gather. It is much easier to write an accurate filter in orthogonal space because for example source generated noise appears as circular noise train. At the same time, in a non-orthogonal hybrid gather, the same source generated noise would need to be described by an ellipse which is harder to parameterize accurately. So while there is nothing preventing one from acquiring a non-orthogonal survey and doing hybrid gathers, it is more complicated.

Hybrid gather sorting is applicable to 3D land, transition zone and OBC/OBN datasets having intersecting source and receiver line geometries. These gathers are the result of sorting the pre-stack data into a hybrid cross-spread domain by selected traces from a subset of receiver lines that intersect an individual source line. This type of ensemble forms a pseudo shot whose effective "source position" lies at the intersecting point of the source and receiver lines. A hybrid gather will be formed at each intersection in the 3D survey.

The advantage of such a sort is the unraveling of signal and noise that is highly aliased in a traditional domain. Hybrid sorting improves sampling in the cross-receiver-line direction and facilitates removal of aliased coherent and random noise using true 3D techniques.

Cross-line sorting allows 3D volumes of data to be constructed using pre-stack data from brick or cross-spread acquisitions. Once in the hybrid domain, processes such as true 3D linear radon are much more effective because of the regularization of the sampling and reduction of aliased noise effects. The technique is particularly effective for wide angle geometries likely to appear in wide azimuth acquisition.

Figure 5:
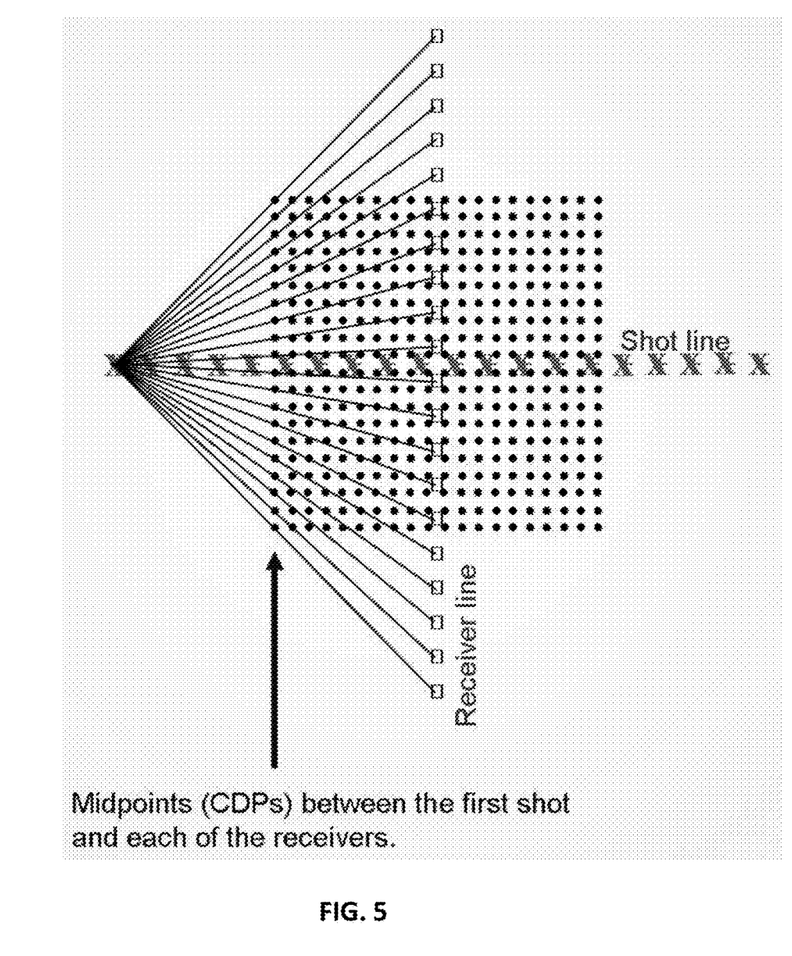
FIG. 5 A typical hybrid gather layout.

FIG. 5 shows a typical hybrid gather formation. In this case we can see the impact of a single shot into the receiver line and the CDP points that shot lays out. By combining the impact of all of the different shots in the shot line, we create a region of single fold data where each bin has one CDP point in the hybrid. This is a classical hybrid gather all ready to use in processing.

Hybrid gathers have historically lagged because development of processing procedures for hybrid gathers was needed to further the efficiency of their application. U.S. Pat. Nos. 6,430,510, 6,026,058 and 6,330,512 have provided some of those advances, and this application takes the application on hybrid gather technology one step further.

This disclosure combines these hybrid gather methodologies with nodal type surveys. From a quality control and survey design perspective, the weak link in any seismic acquisition project is the maze of cables that connects all the receivers or geophones and recording and monitoring equipment. Cables are susceptible to failure for a variety of reasons, and every failure leads to downtime and added survey cost while the cable is recovered and repaired.

A simple solution is available—eliminate the cables! That is the premise behind "nodal" seismic systems, currently being deployed on ocean bottoms and to a greater extent have taken over the land seismic business. Because they contain no cables or wires, the systems' self-contained receivers eliminate the need to troubleshoot for cable problems. Once the nodes are deployed, the seismic crew can begin immediate shooting.

Figure 6:
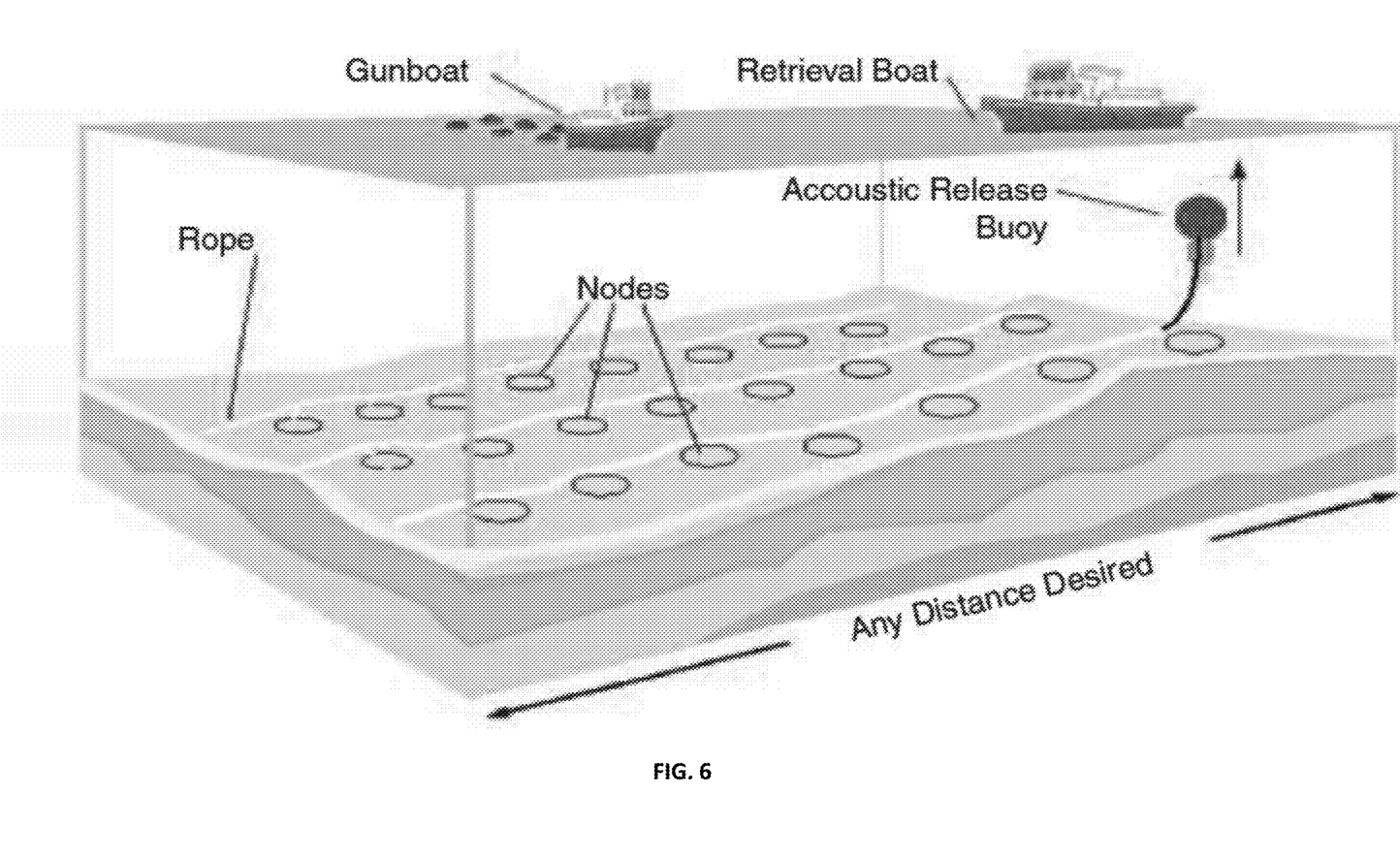
FIG. 6 A simplified schematic of a marine nodal survey.

A marine nodal survey is depicted in FIG. 6. Offshore nodal surveys only require two vessels: a gunboat (seismic source) and a node deployment and retrieval boat. In shallow waters, the nodes are deployed by rope and retrieved using an acoustic buoy although there are many methods for deployment. Some vendors deploy on ropes, while others deploy with remotely operated vehicles (ROV's) or autonomous underwater vehicles (AUV's).

Three other factors make nodal surveys less expensive than ocean bottom cable surveys. First, nodal surveys only require two vessels—a node-handling vessel and a dual-source shooting vessel—and neither needs to be dynamically positioned. In contrast, OBC surveys usually require a shooting vessel and two cable vessels, at least one of which needs to be dynamically positioned.

Second, the nodes and associated equipment weigh half as much and take up less space than the cables and equipment needed for OBC surveys. Since more receivers will fit in a given area and less equipment needs to be handled during deployment, the vessels and crews can be smaller. As a result, a nodal 3D marine survey typically costs on the order of 40 percent less than a comparable OBC survey.

Finally, nodal systems can be deployed in virtually any geometry to meet acquisition requirements, whether surveying around seafloor obstacles or achieving high-resolution densities and obtaining long offsets with rich azimuths. Unlike cabled systems, nodes do not require a fixed interval or a straight line between receivers. If the crews need to place a node on an incline or survey around an obstacle, they can. This helps make deployment more efficient.

The flexibility of nodal seismic acquisition has an even greater benefit in that it enables surveys to reduce or eliminate gaps in the data. If the survey includes a coral reef, an oyster bed with an uncooperative leaseholder, or any other area that is off limits, the seismic crew can surround it with nodes, without entering or damaging the off-limit zone. While there still might be a gap, it will typically be much smaller than the one in a cabled survey.

Even without filling in gaps, nodes achieve higher-quality seismic data. Instead of transmitting information through damage-prone cables, the nodes record and store data on internal circuitry that is protected by an aluminum housing wrapped in a high-impact plastic bumper. More often than not, this keeps the data cleaner than data transmitted via cables.

The disclosure thus combines nodal surveys with hybrid gathers, thus allowing for the greater flexibility and reduced noise of a nodal survey together with the alias reduction of a hybrid gather processing method.

While designing a nodal survey in the North Sea, we noted that one could create the conventional hybrid gather by assembling a grid of shots into a single nodal receiver. This gives us the same hybrid processing capability of the conventional cross spread hybrid. U.S. Pat. No. 6,026,058 etc. do not describe this possibility and thus misses the upside of reducing the source effort in a marine survey environment.

We are shooting more and more node surveys at ConocoPhillips, and we believe that offshore sparse node OBN surveys may be the standard in future ocean bottom style surveys, especially in deep water environments. In these deep environments the weight of the ropes to deploy the nodes becomes a limiting factor and adds significantly to the mechanical bulk on the boat. Also the ropes tend to be blown offline in the currents so accurate placement is hindered.

The technical and economic advantage to combined hybrid gather and nodal-type surveys is that it allows us to continue to use our hybrid gather technology and processing flows to their full advantage. This also allows us to design optimal surveys at less cost by shooting sparse nodal surveys instead of deploying the more cumbersome and failure prone OBC cables.

Figure 7:
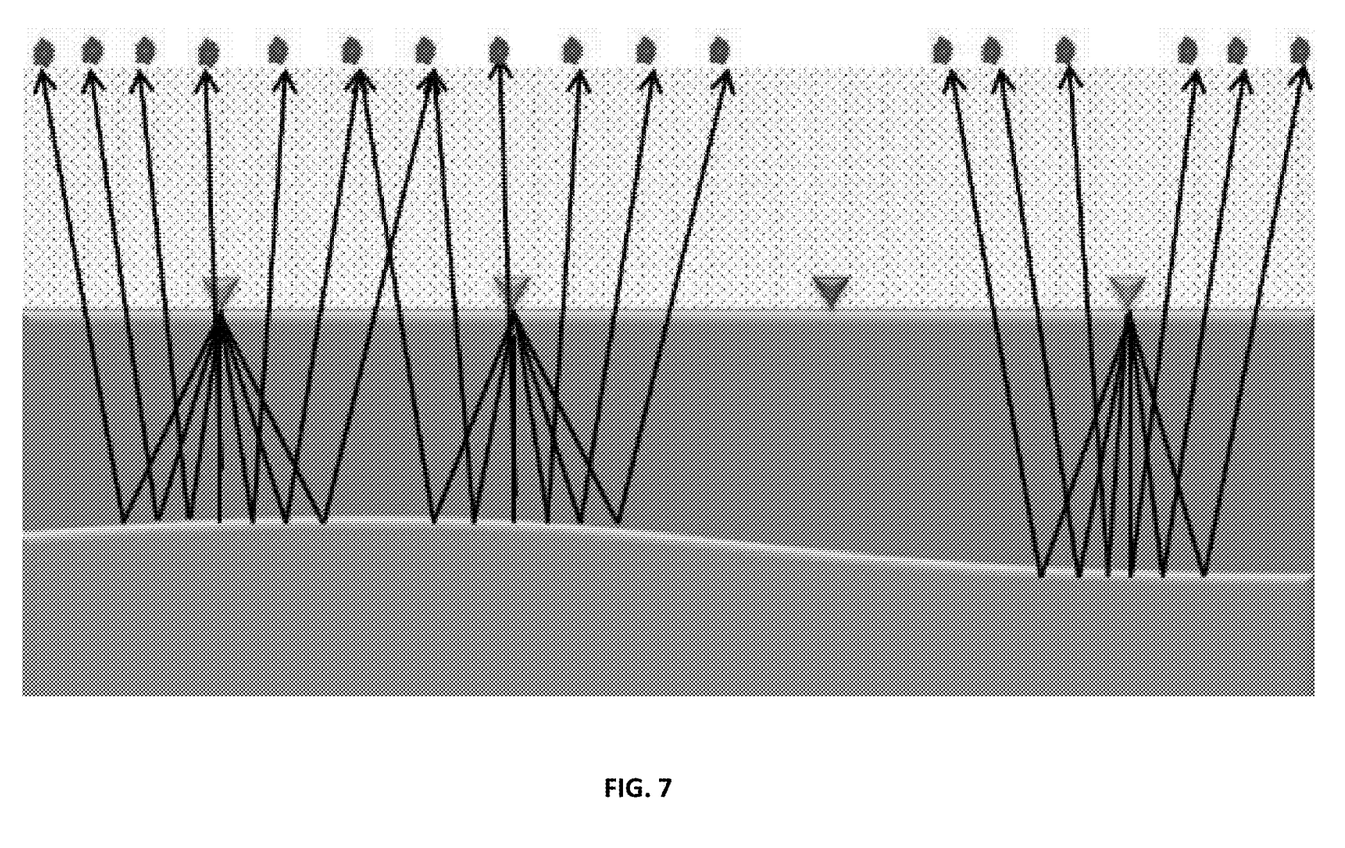
FIG. 7. A sparse nodal survey, showing gaps in coverage. Shots are shown as red dots, live nodes are shown as yellow triangle, and dead node is shown as red triangle.

One economical and practical acquisition geometry for ocean-bottom node survey is that of using sparse node intervals with a dense grid of shots. However, the sparse node geometry provides poor illumination for shallow reflectors, which are shallower under the seabed than the node intervals. FIG. 7 shows illumination on the sea floor with sparse node intervals.

This problem can be overcome by separating the data from hydrophone and geophone into up-going (U) from down-going (D) waves. The OBN multiples (down-going wavefield) can be used to have a better structural image of subsurface from wider angles. The multiples reflect from the same reflectors, which the primary waves reflect from. However, multiples take longer wave path and cover wider area than primaries.

Another advantage of multiples over the primaries is that multiples can provide more information than primaries. This is because multiples consist of up-going primaries that reverberate once in the water layer.

Figure 8A:
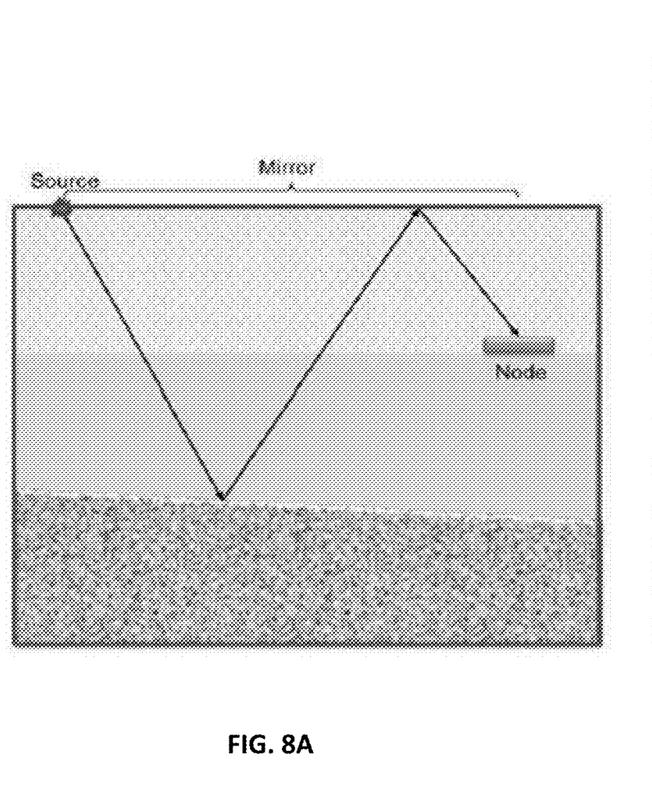
FIG. 8A-B. Ray paths of down-going (A) wave and mirror imaged down-going (B) wave. Down-going wave can be imaged as primaries recorded on a sea surface twice as high. The sea surface acts like a mirror for primary reflections. The down-going multiple is an up-going primary reflected downward at the sea surface.
Figure 8B:
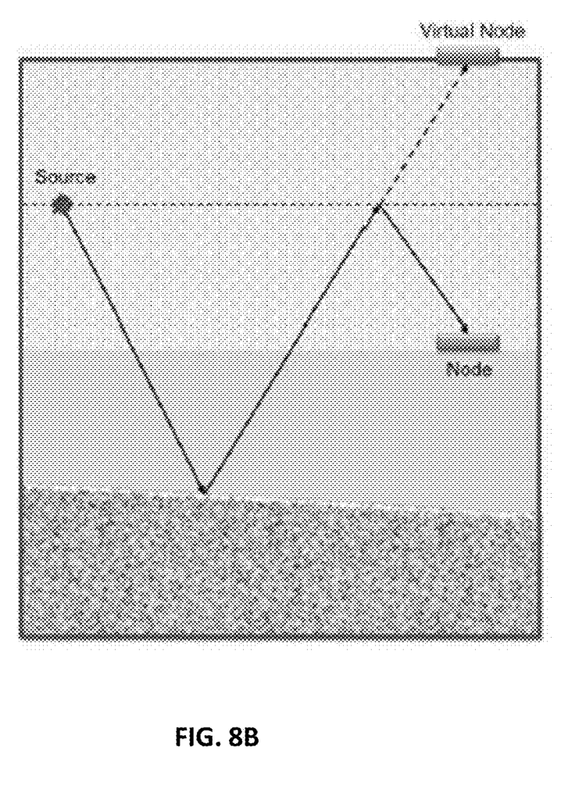

Migration of the OBN data by using multiples (down-going receiver ghosts) is called mirror imaging because the sea surface takes the role as a mirror, which reflects the image of subsurface structure. FIG. 8 demonstrates the ray paths of down-going wave and mirror imaged down-going wave.

Figure 9A:
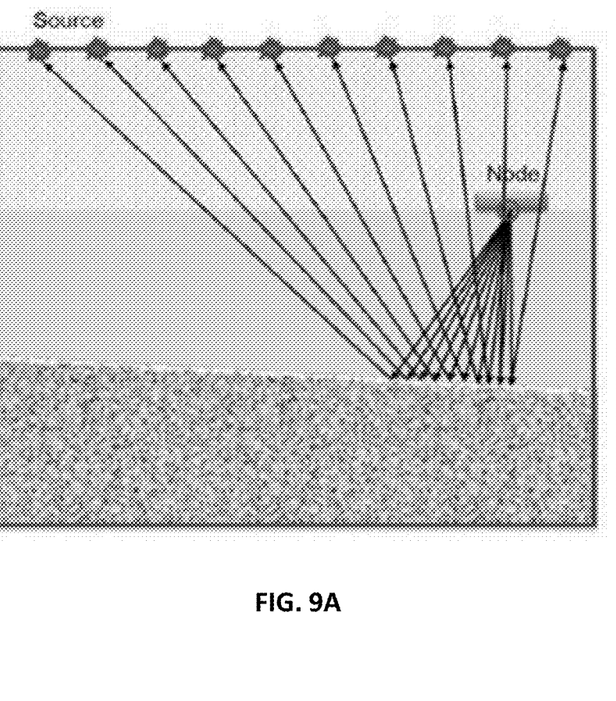
FIG. 9A-B. Illumination of the up-going (A) wave and down-going (B) wave. It is clear that up-going wave has narrow illumination than down-going wave. Red circles are shows illuminated area.
Figure 9B:
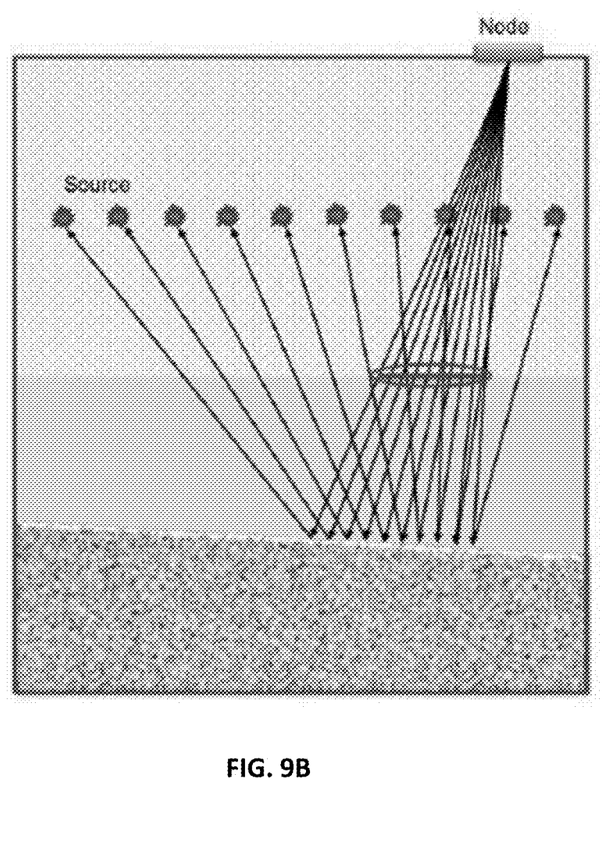

Imaging of multiples (down-going receiver ghosts) provides better and extended illumination of subsurface reflectors than imaging primaries. This is because primaries cannot reach the shadow zones to illuminate. However, multiples can penetrate into the earth to illuminate the shadow zones. FIG. 9 shows the illumination of up-going wave and down-going wave. It can be seen from figure that number of rays is the same in both FIG. 9A and FIG. 9B, however in the FIG. 9B (mirror imaging) rays are distributed over wider area.

Figure 10A:
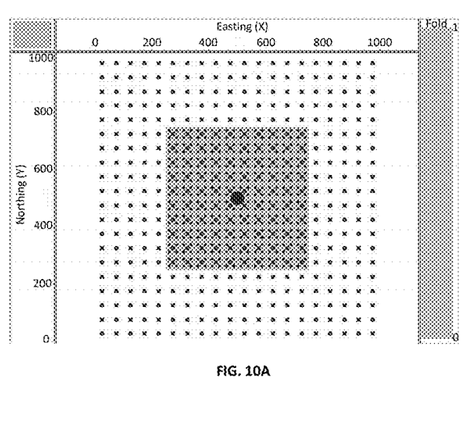
FIG. 10A-B. Examples of a sparse nodal survey with hybrid gather.
Figure 10B:
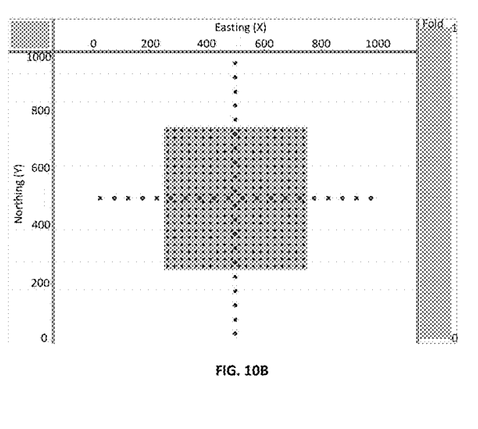

Combining sparse nodal surveys with hybrid gathers is shown in FIG. 10A-B. FIG. 10A, for example, is an example of a nodal hybrid gather. The grid of sources in the example are shown as squares and are arrayed at 50 m station spacing in both in line and cross line. The single nodal receiver is placed at the center of the grid of sources. The CMP points are shown as the small circular points while the larger light grey box is the zone of single fold data that represents the hybrid gather space. Comparing to FIG. 5 shows the results are the same.

FIG. 10B is a single hybrid gather showing a single source line and receiver line both with station spacing of 50 m and with the same CMP points as small circular points and the larger grey box is the zone of single fold coverage created in this hybrid gather. The resultant hybrid in both figures is the same, and both 10A and B illustrate the invention in a simplified form.

Data processing proceeds generally as is described in U.S. Pat. Nos. 6,430,510, 6,026,058 and 6,330,512, but with modifications to account for the fact that each node must be treated independently from the rest and each node represents its own hybrid gather. Generally speaking, the data processing includes the following steps:

During the survey design stage, the data must be adequately sampled to avoid aliasing. Thus, presurvey modeling and analysis are strongly recommended. The risk otherwise is to have the nodes laid out too coarse on the seabed or land and have a situation where there was insufficient sampling to develop useable signal to noise in the final survey.

Once the sampling criteria have been established, an orthogonal survey is preferred for the sources, and the sampling criteria effectively fixes the geometry of the survey and the acquisitions parameters. It is possible to the hybrid gathers to have a non-uniform line and station spacing and to acquire the data in a non-orthogonal manner, but as pointed out, it is more difficult.

In the data collection phase, there are no particular requirements beyond normal quality control of the source and navigation. One needs to make sure that the survey is put in the right place and that the sources and receivers are basically working. Beyond that the hybrid gather application makes no particular requirements to the method, which can proceed according to any known or invented protocol.

Upon data recovery from the nodes, the data would be normally processed and as the need for hybrid type filtering or processing presented itself, hybrid gathering would occur. The processor would identify offset distance or size of the hybrid gather required and then sort out the appropriate shots into each receiver node that met the offset requirement. At that point the hybrid gather would be established and the processing would continue.

This method can be applied to new software or to any existing software platform for doing e.g., 2D, 3D, 4D and even 5D seismic processing and imaging provided the appropriate coding or module is applied thereto and otherwise consistent with the programming parameters. Exemplary software includes, e.g., Petrel E&P, PetroSys, Omega, GeoPro, SeisWare Seismic Software, Paradigm Echos® seismic processing and imaging solutions, GeoCraft, and the like.

Further, the seismic processing and imaging software can be combined with other reservoir and geological modeling systems, such as geophysical model building, rock physics evaluation, and reservoir modeling, e.g., IBM® System Blue Gene/P® Solution, the Jason™ software suite, JewelSuite, and the like.

A large list of free geophysics software is published at en.wikipedia.org/wiki/List_of_free_geophysics_software and is incorporated by reference herein in its entirety.

Hardware may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system.

Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors, which we normally use with Gedco's Vista™ processing package.

Slower systems could be used but are less preferred since seismic processing and imaging is already compute intensive.

The methods discussed herein are understood to have additional steps, that are well known to practitioners in the art. Thus, migration, normal moveout, and the like are not detailed hereunder.

The following references are incorporated by reference in their entirety for all purposes.

U.S. Pat. No. 6,430,510 application of hybrid gathers for rapid determination of seismic acquisition parameters
U.S. Pat. No. 6,026,058 Method for sorting seismic data
U.S. Pat. No. 6,330,512 Hybrid gather ground-roll suppression
Perez A. M., Azimuthal Analysis of Hybrid Gathers, Master Thesis 2009 (University of Texas), online at repositories.lib.utexas.edu/bitstream/handle/2152/ETD-UT-2009-05-118/PEREZ-THESIS.pdf?sequence=2
Pacal E. E., SEISMIC IMAGING WITH OCEAN-BOTTOM NODES (OBN): NEW ACQUISITION DESIGNS AND THE ATLANTIS 4C OBN SURVEY, Masters Thesis 2012 (University of Houston), online at agl.uh.edu/pdf/theses/2012-pacal.pdf.
Wei, L., et al., Imaging Quality with Sparse Acquisition Parameters in Ocean Bottom Node Survey, 75th EAGE Conference & Exhibition incorporating SPE EUROPEC 2013, earthdoc.eage.org/publication/publicationdetails/?publication=69021
Morton A. et al., Evaluation and impact of sparse-grid, wide-azimuth 4C-3D node data from the North Sea, 73rd SEG International Exposition & Annual Meeting—Dallas, Texas—26-31 Oct. 2003, online at cgg.com/technicalDocuments/cggv_0000000697.pdf
Olofsson B. et al., Decimation test on an ocean-bottom node survey: Feasibility to acquire sparse but full-azimuth data, Geoscience World 31(4): 457-464 (2012), online at tle.geoscienceworld.org/content/31/4/457.abstract
Vermeer, G. J. O, Processing orthogonal geometry—what is missing?, online at 3dsymsam.nl/lib/exe/fetch.php?media=processing_orthogonal_geometry.pdf

The invention claimed is:

1. A method of creating hybrid gather for seismic data processing, the method comprising:
providing a first layout of one or more seismic sources and a second layout of one or more cable-free node receivers over a subsurface reservoir;
actuating the one or more seismic sources a plurality of times according to the first layout, wherein actuation of the one or more seismic sources generates one or more seismic waves and each of the one or more cable-free node receivers collect a seismic data set based on the one or more seismic waves of actuation of the one or more seismic sources;
determining a size of a hybrid gather based on the seismic data set of each of the one or more cable-free node receivers;
collecting a trace at each of the one or more cable-free node receivers for each actuation of the one or more seismic sources that meets the size of the hybrid gather;
storing a collected trace at each of the one or more cable-free node receivers, respectively; and
sorting the collected trace from each actuation of the one or more seismic sources into a unique hybrid gather for each of the one or more cable-free node receivers, wherein,
the hybrid gather is used for filtering, processing, or analyzing the seismic data.

2. The method of claim 1, further comprising:
imaging a 3D seismic map of the subsurface reservoir.

3. The method of claim 1, wherein adjacent node receivers of the one or more node receivers are sparsely positioned such that a spacing between the adjacent node receivers in a line is more than one half of another spacing between adjacent receiver lines.

4. The method of claim 1, wherein the one or more node receivers are ocean bottom node receivers.

5. The method of claim 1, wherein the one or more node receivers are land node receivers.

6. The method of claim 1, wherein the one or more seismic sources and/or the one or more node receivers are uniformly placed on a grid.

7. The method of claim 1, wherein the one or more seismic sources and/or the one or more node receivers are not uniformly placed on a grid.

8. The method of claim 1, wherein the one or more node receivers are not uniformly placed on a grid, and the one or more seismic sources are uniformly placed on the grid.

9. The method of claim 1, further comprising:
separating the seismic data in to up-going waves and down-going waves, wherein the down-going waves are sorted into the hybrid gather for use in filtering, processing, and/or analyzing the seismic data.

10. The method of claim 9, further comprising:
imaging a 3D seismic map of the subsurface reservoir utilizing the down-going waves.

11. A method of seismic data processing to provide a 3D image of a reservoir, the method comprising:
providing a first layout of one or more seismic sources and a second layout of one or more cable-free node receivers over a subsurface reservoir;
actuating the one or more seismic sources a plurality of times according to the first layout, wherein actuation of the one or more seismic sources generates one or more seismic waves and each of the one or more cable-free node receivers collect a seismic data set based on the one or more seismic waves of actuation of the one or more seismic sources;
determining a size of a hybrid gather based on the seismic data set of each of the one or more cable-free node receivers;
collecting a trace at each of the one or more cable-free node receivers for each actuation of the one or more seismic sources that meets the size of the hybrid gather;
sorting the trace from each of the one or more cable-free node receivers into a unique hybrid gather for each of the one or more cable-free node receivers, wherein the hybrid gather is used for filtering, processing, or analyzing the seismic data;
storing a collected trace at each of the one or more cable-free node receivers, respectively; and
imaging a 3D seismic map of the subsurface reservoir.

12. The method of claim 11, wherein adjacent node receivers of the one or more node receivers are sparsely positioned such that a spacing between the adjacent node receivers in a line is more than one half of another spacing between adjacent receiver lines.

13. The method of claim 11, wherein the one or more node receivers are ocean bottom nodes.

14. The method of claim 11, wherein the one or more node receivers are land nodes.

15. The method of claim 11, wherein the first layout is a square grid, and the one or more seismic sources are uniformly placed on the grid.

16. The method of claim 11, wherein the second layout is a rectangular grid, and the one or more node receivers are uniformly placed on the grid.

17. The method of claim 11, wherein the one or more seismic sources are not uniformly placed on a grid.

18. The method of claim 11, wherein the one or more node receivers are not uniformly placed on a grid.

19. The method of claim 11, further comprising:
separating the seismic data in to up-going waves and down-going waves, wherein the down-going waves are sorted into the hybrid gather for use in filtering, processing, and/or analyzing the seismic data.

20. The method of claim 19, wherein the imaging of the 3D seismic map of the subsurface reservoir utilizes the down-going waves.

* * * * *